United States Patent [19]

Hallidy

[11] Patent Number: 5,066,866
[45] Date of Patent: Nov. 19, 1991

[54] POWER CONVERTER SYSTEM

[76] Inventor: William M. Hallidy, 620 E. Laurel Ave., Glendora, Calif. 91740

[21] Appl. No.: 456,990

[22] Filed: Dec. 26, 1989

[51] Int. Cl.5 .............................................. H02P 9/00
[52] U.S. Cl. .................................. 290/1 R; 290/40 R; 322/93
[58] Field of Search .................... 322/93; 290/1 R, 40

[56] References Cited

U.S. PATENT DOCUMENTS

| | | | |
|---|---|---|---|
| 580,180 | 4/1897 | Wade et al. | 322/93 |
| 2,878,542 | 8/1959 | Wasko et al. | 322/93 |
| 3,035,222 | 5/1962 | Stone | 322/93 |
| 3,400,318 | 9/1968 | Hill | 322/93 |
| 3,668,514 | 6/1972 | Peck | 322/28 |
| 3,676,694 | 7/1972 | Schneider et al. | 307/10.1 |
| 3,681,611 | 8/1972 | Watson | 307/10.1 |
| 3,770,976 | 11/1973 | Stroud et al. | 307/10.1 |
| 3,790,808 | 2/1974 | Sagl | 307/10.1 |
| 3,824,404 | 7/1974 | Ghere | 307/10.1 |
| 3,953,740 | 4/1976 | Seiter, Jr. | 307/10.1 |
| 4,074,145 | 2/1978 | Laffoon et al. | 307/10.1 |
| 4,153,869 | 5/1979 | Ragaly | 322/93 |
| 4,749,935 | 6/1988 | Osborne | 322/8 |
| 4,780,619 | 10/1988 | Campbell et al. | 307/10.1 |

Primary Examiner—A. D. Pellinen
Assistant Examiner—Robert L. Hoover

Attorney, Agent, or Firm—Pretty, Schroeder, Brueggemann, & Clark

[57] ABSTRACT

An electrical apparatus for use with a motor vehicle electrical system, which includes an engine-driven alternator, provides a switching circuit for switching the system between a normal-power state and a high-power state. In the normal-power state, the apparatus provides the nominal electrical power needed by the vehicle electrical system and battery. In the high-power state, the apparatus causes the engine-driven alternator to produce a higher voltage and a higher power output for external loads, while still providing the nominal electrical power for the vehicle electrical system and the vehicle battery. In the normal-power mode of operation, the vehicle voltage regulator sees the full voltage generated by the vehicle alternator. In the high-power mode of operation, the vehicle voltage regulator sees only a reduced portion of the full voltage generated by the vehicle alternator. The increased power output from the alternator can be rectified into a high-voltage DC current or can be converted to 60 HZ 110-volt AC power by means of a cycloconverter, for example. A control circuit senses load current in the high-power mode of operation and causes the engine to operate at an increased speed to maintain the increased power output. The control circuit reduces the engine speed to idling speed when there is no load current.

11 Claims, 6 Drawing Sheets

POWER CONVERTER SYSTEM

BACKGROUND OF THE INVENTION

1. Field of the Invention

This invention relates to vehicle-mounted electrical generating systems, and more particularly to apparatus incorporated with the electrical generating system of a vehicle for producing the electrical power necessary for the electrical system of the vehicle and also, at the same time, producing power for operating auxiliary power loads such as electrically-driven power hand tools, lamps, and the like.

2. Description of the Related Art

Portable electric tools, lamps, and like electrically-powered accessories must sometimes be used at remote locations where the usual household 110-volt alternating current (AC) electrical supply is unavailable. In such instances, a vehicle-mounted electrical generating system can provide an electrical supply.

Vehicle-mounted electrical generating systems normally include an engine-driven alternator. These automotive engine-driven alternators are used to produce low-voltage AC electrical power which is then rectified to produce direct current (DC) electrical power for use by the vehicle's electrical system. Thus, these alternators provide a readily available potential source of power for portable tools, lamps, and like electrically-powered accessories.

The magnitude of the electromotive force generated in alternator stator windings is determined both by the strength of the magnetic field that is linking with the alternator windings and by the rate of rotation of the magnetic field, which changes the flux linkages between the magnetic field and the alternator stator windings.

The electric windings in the stator are designed so that the alternator is capable of generating a voltage sufficient to charge the vehicle battery when the alternator rotor, containing the electromagnetic field, is rotated at a low, or idling, engine speed. When the alternator rotor is driven at a higher speed, the alternator is capable of generating a higher voltage than is required to charge the vehicle battery and to supply the vehicle electrical system. This higher voltage is normally not desirable because it would harm the battery and the vehicle electrical system. Therefore, when the alternator rotor is driven at a higher speed, the alternator voltage regulator acts to reduce the current in the alternator field coil and thus to maintain the generated voltage at the desired level for charging the vehicle battery and for the vehicle electrical system.

The typical vehicle-mounted automotive alternator can produce only a limited amount of electric current, even at short-circuit conditions. The amount of electric current that the automotive alternator can generate is determined by the physical size and shape of the alternator and by the design of the electric windings in the alternator stator. An exemplary conventional 80 amp alternator can generate a maximum of only 80 amps, and can do so only at very high engine speeds. This exemplary 80 amp alternator can generate only 55 amps continuous-duty without overheating. With the maximum generated continuous-duty electric current limited to 55 amps by the physical construction and design of the vehicle alternator, and with the maximum generated voltage limited to 14 volts DC by the action of the voltage regulator to protect the vehicle battery and electrical system, the maximum continuous-duty generated output power of the exemplary alternator is limited to approximately 770 watts.

Alternators ordinarily found in the vehicle-mounted electrical generating systems for automobiles and light trucks are typically capable of producing a maximum of 600 to 800 watts of continuous duty electrical power at moderate engine speeds without overheating. Converters are available that take the low-voltage AC generated by the alternator to produce high-voltage DC power, on the order of 100-110 volts, that can be used to power universal-motor tools, lamps, and other accessories compatible with DC power. These converters provide a source of electrical power at remote locations or wherever 110-volt AC power is unavailable.

Unfortunately, many of the most useful power tools and accessories that would be used at remote locations require a minimum of 1200 to 1400 watts of electrical power. These include drills, winches, and lamps. Most of the presently available converters can alter both the voltage and the form (AC or DC) of the electrical power from the vehicle alternator, but cannot increase the power that the typical automotive or light truck alternator is capable of producing, which is 600 to 800 watts of continuous duty power at moderate engine speeds.

Some presently available converters disconnect the vehicle-mounted alternator stator windings and rotor field windings from the vehicle electrical system and then separately excite the alternator field windings to produce high voltage while the alternator is operated at a relatively high speed. These systems are relatively expensive because of the need for a separate source for the field current while the alternator and converter are in the auxiliary power mode of operation. In addition, these converters cannot be used for any significant length of time without risking completely discharging the vehicle battery, which is without a source of recharging current while the converter is in use.

Other converter systems are available for use with special heavy-duty alternators that are capable of producing 1200 to 1400 watts of electrical power, but these heavy-duty alternators are generally limited to heavy equipment and vehicles of rugged construction, and are prohibitively expensive.

Ranchers, farmers, construction workers, and others who could greatly benefit from a readily available, inexpensive, and reliable source of power when away from 110-volt AC household power are thus hard pressed to find a suitable solution.

Thus, there is a need for an inexpensive power converter system that will allow the 600 to 800 watt alternator normally found in the vehicle-mounted electrical generating systems for automobiles and light trucks to produce, at moderate engine speeds, 1200 to 1400 watts of continuous duty electrical power for use as an auxiliary power source for power tools, lamps, and other accessories while still, at the same time, providing the correct DC electrical power for the vehicle's electrical system.

SUMMARY OF THE INVENTION

The present invention allows the vehicle-mounted electrical generating system to operate in a normal-power mode to provide normal electrical power for the vehicle electrical system, and to operate in a high-power mode to provide high power for external loads while still, at the same time, providing normal electrical power to the vehicle electrical system.

The present invention provides an electrical apparatus that can be selectively arranged to operate the vehicle-mounted electrical generating alternator at the optimum combination of voltage and current for the maximum required power generating capability. The invention also provides apparatus whereby the vehicle-mounted electrical generating alternator can generate a higher than normal amount of power by generating a higher than normal voltage, while still providing normal voltage to the vehicle electrical system for battery charging and lights.

The present invention enables the vehicle alternator to generate the maximum power of which it is capable at higher engine speeds to provide high-power electrical energy for external loads while the voltage regulator controls, at the proper and correct level, the voltage supplied for charging the vehicle battery and for the vehicle electrical system. An exemplary apparatus is capable of producing approximately 1400 watts of power from a vehicle alternator normally rated at 770 watts capability. The electrical apparatus can be located in the engine compartment of the motor vehicle, and therefore is available at any remote location that the vehicle may reach.

In accordance with the present invention, the apparatus operates in either a normal-power state or in a high-power state. In the normal-power state, the alternator rectifiers, the voltage regulator, and the vehicle electrical system see substantially all of the voltage generated by the alternator stator windings. The voltage regulator controls the current to the field coil in the rotor of the alternator to maintain 14 volts DC at the voltage regulator terminals. This is the voltage ordinarily required for recharging the vehicle battery and for the vehicle electrical system.

In the high-power state, the alternator rectifiers, the voltage regulator, and the vehicle electrical system see only a portion of the alternator stator generated voltage. Relays or switches control the proportion of the generated stator voltage provided to the alternator rectifiers, the voltage regulator, and the vehicle electrical system. The voltage regulator, in response to the reduced stator voltage it sees, will control the field coil current so as to generate sufficient stator AC voltage to provide 14 volts DC at the voltage regulator terminals. The result is that the full generated AC voltage from the stator windings is much higher than the AC voltage that would ordinarily be required to develop 14 volts DC. This increased voltage can then be supplied to an AC load or rectified to a DC voltage for an external DC load. In addition, this increase in the generated voltage with the same maximum continuous duty current capability means that the maximum continuous duty power rating of the alternator has been increased.

An apparatus in accordance with the present invention includes an engine-driven alternator that has been modified to provide separate access to the AC stator windings and to the built-in alternator rectifiers. Further, the apparatus includes switching means to selectively connect the built-in alternator rectifiers, and thus the voltage regulator, either directly to the full stator windings or to leads or taps connected to a reduced portion of the full stator output.

In one version, the apparatus in accordance with the present invention can include a vehicle transformer having a primary winding and a secondary winding. In the normal-power state, all of the alternator stator output is directed to the alternator rectifiers, the voltage regulator, and the vehicle electrical system. In the high-power state, all of the alternator stator output is directed to the full primary winding of the transformer. A reduced portion of the stator output is then directed from the transformer primary back to the alternator rectifiers, the voltage regulator, and the vehicle electrical system. Preferably, the portion of the stator output for providing a reduced portion of the stator output is obtained by taps on the primary winding of the transformer.

Alternatively, the apparatus of the present invention can include a supplementary transformer having a primary winding and a secondary winding, and can also include taps on the alternator stator windings for directing the reduced portion of the generated voltage to the alternator rectifiers, the voltage regulator, and the vehicle electrical system. In the normal-power state, all of the alternator stator output is directed to the voltage regulator and the vehicle electrical system. In the high-power state, all of the alternator stator output is directed to the primary winding of the transformer. A reduced portion of the stator output is then directed from the taps on the stator windings to the alternator rectifiers, the voltage regulator, and the vehicle electrical system. The increased voltage generated in the full stator windings is applied to the transformer primary and causes the transformer secondary to operate at full voltage.

In still another apparatus in accordance with the present invention, the full alternator stator output is connected directly to the rectifiers of the auxiliary power supply for external loads and also includes taps on the alternator stator windings for directing the reduced portion of the generated voltage to the alternator rectifiers, the voltage regulator, and the vehicle electrical system. There is no supplementary transformer in the apparatus. In the normal-power state, all of the alternator stator output is directed to the auxiliary power supply for external loads and also to the alternator rectifiers, the voltage regulator, and the vehicle electrical system. In the high-power state, all of the alternator stator output is directed to the auxiliary power supply for external loads and a reduced portion of the stator output is then directed from the taps on the stator winding back to the alternator rectifiers, the voltage regulator, and the vehicle electrical system. This apparatus would be especially useful, for example, where only 50% of the alternator stator generated voltage is directed back to the alternator rectifiers, the voltage regulator, and the vehicle electrical system in the high-power mode of operation. This particular arrangement of the apparatus would provide a dual voltage system with a choice of either 14 volts DC normal-power or 28 volts DC high-power available at the auxiliary power supply for either nominal 12-volt or nominal 24-volt external loads and electrical systems.

In yet another version, an apparatus in accordance with the present invention can eliminate the need for a separate transformer by including a second or supplementary winding in the alternator stator. The apparatus would also include taps on the primary alternator stator windings for directing the reduced portion of the generated voltage to the alternator rectifiers, the voltage regulator, and the vehicle electrical system. This version is analogous to having eliminated the need for a transformer with a primary winding and a secondary winding by placing the transformer secondary winding directly in the alternator stator, thus eliminating the need for a separate transformer. In the normal state, the full stator output is directed to the alternator rectifiers, the voltage regulator, and the vehicle electrical system. In the normal-power state, the second or supplementary winding operates at a reduced voltage. In the high-power state, a reduced portion of the stator output is then directed from the taps on the stator windings to the alternator rectifiers, the voltage regulator, and the vehicle electrical system. Both the full primary stator winding and the supplementary or second stator winding operate at increased voltage and increased power capability.

In all instances, the apparatus in accordance with the present invention can include an engine throttle control apparatus sensitive to load current in the auxiliary power supply circuit for increasing the engine speed to a level that provides the increased power capability of the vehicle-mounted alternator. In one embodiment, when the apparatus is placed in the high-power mode of operation, the engine continues to operate at low or idle speed until the engine throttle control apparatus senses the presence of load current in the auxiliary power circuit. The engine throttle control circuit then increases the engine speed to a predetermined level. The engine throttle control apparatus returns the engine to a low or idling engine speed when the load is removed from the auxiliary power supply.

Thus, the present invention provides a vehicle-mounted electrical generating system that provides electrical power for auxiliary power loads and also increases the generated power significantly above the normal power generating limits of the vehicle-mounted electrical generating system. The present invention allows the vehicle-mounted electrical generating system to operate at the particular combination of alternator output voltage and current that results in the maximum possible power output from the alternator for use with an auxiliary power supply for operating auxiliary power loads such as electrically-driven power hand tools and the like, while at the same time allows the vehicle-mounted electrical generating system to provide the nominal electrical power for the electrical system of the vehicle.

BRIEF DESCRIPTION OF THE DRAWINGS

Preferred embodiments of the invention are described below in detail with reference to the accompanying drawings, wherein like reference numerals refer to like elements.

DESCRIPTION OF THE PREFERRED EMBODIMENTS

The following detailed descriptions are of the best presently contemplated modes of carrying out the present invention. The descriptions are made for the purpose of illustrating the general principles of the invention and are not to be taken in a limiting sense.

For consistency, the high-power auxiliary power supply for the external loads is shown in all of the figures as rectified direct current (DC). In actual practice, the rectifiers in the high-power auxiliary power supply circuit could be replaced by phase control silicon controlled rectifiers (SCRs) to form what is known to those skilled in the art as a simple cycloconverter to produce, for example, 110 volt single phase 60 HZ alternating current (AC) power for external loads. Another embodiment of the present invention could provide 14 volts DC at the auxiliary power supply terminals in the normal-power mode of operation, and provide 28 volts DC at said terminals in the high-power mode of operation. Additionally, for consistency, the vehicle alternator is shown in all of the schematic diagrams with a built-in or integral voltage regulator. The present invention is equally applicable to a vehicle alternator with an external voltage regulator, as will be appreciated by those skilled in the art.

Figure 1:
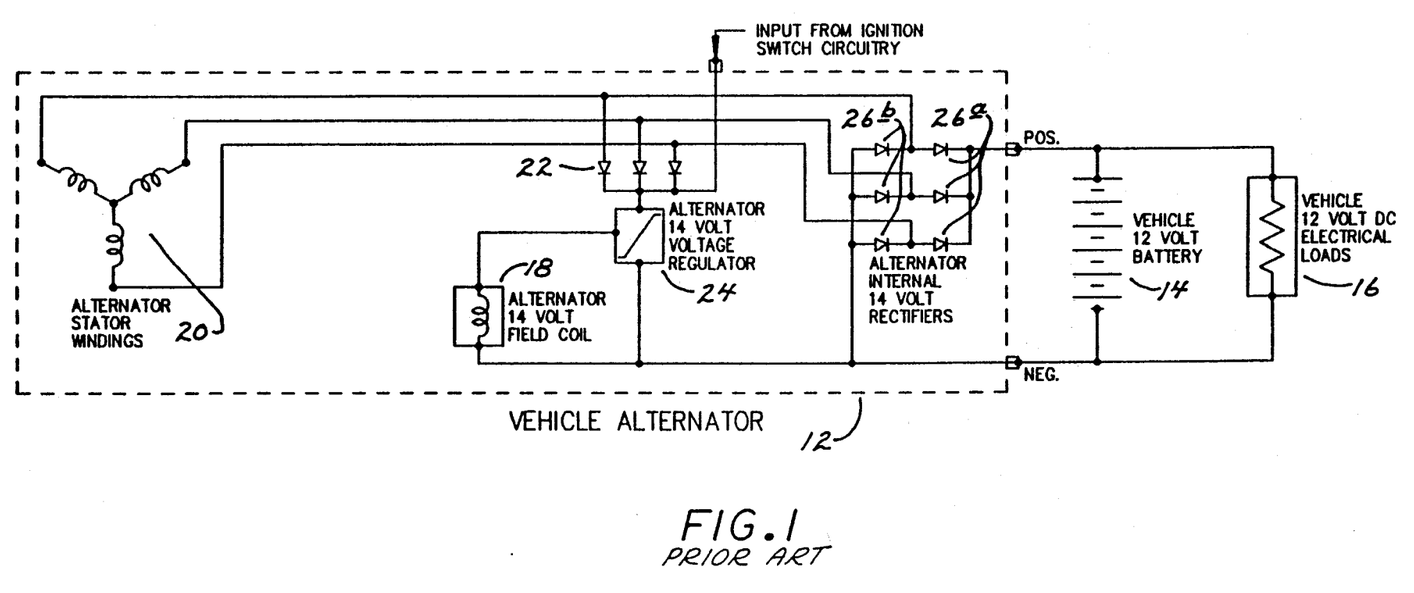
FIG. 1 is a schematic diagram of a conventional motor vehicle electrical generating system.

A conventional prior art vehicle electrical system, shown in FIG. 1, will be discussed first to provide a better basis for understanding the present invention. The system includes a vehicle alternator 12 connected to the 12-volt battery 14 of the vehicle. Connected to the system but not shown are a variety of vehicle 12-volt DC electrical loads 16, such as lights, a radio, ventilation fan, etc. The alternator includes a field coil 18 wound on a rotor and also includes a fixed stator having stator windings 20 and diodes 22, 26a, and 26b. An alternating electrical voltage is generated in the stator windings when a field current flows in the field coil to produce lines of magnetic flux and the rotor is made to rotate with respect to the stator windings. The alternating current from the stator windings is rectified to a direct current by the plurality of diodes 22 and 26b. The rectified stator output is delivered to a voltage regulator 24. The voltage regulator sees the rectified voltage from the diodes 22 and 26b, and regulates the current sent to the field coil 18 so as to maintain a rectified 14-volt DC output from the diodes and thereby control the amount of AC voltage induced in the stator windings. The electrical output from the stator windings is also rectified by another plurality of diodes 26a and 26b, and then provided to the vehicle electrical system and to the vehicle battery 14 to keep it charged. The alternator, the plurality of diodes, and the voltage regulator comprise the electrical generating system for the vehicle.

Figure 2:
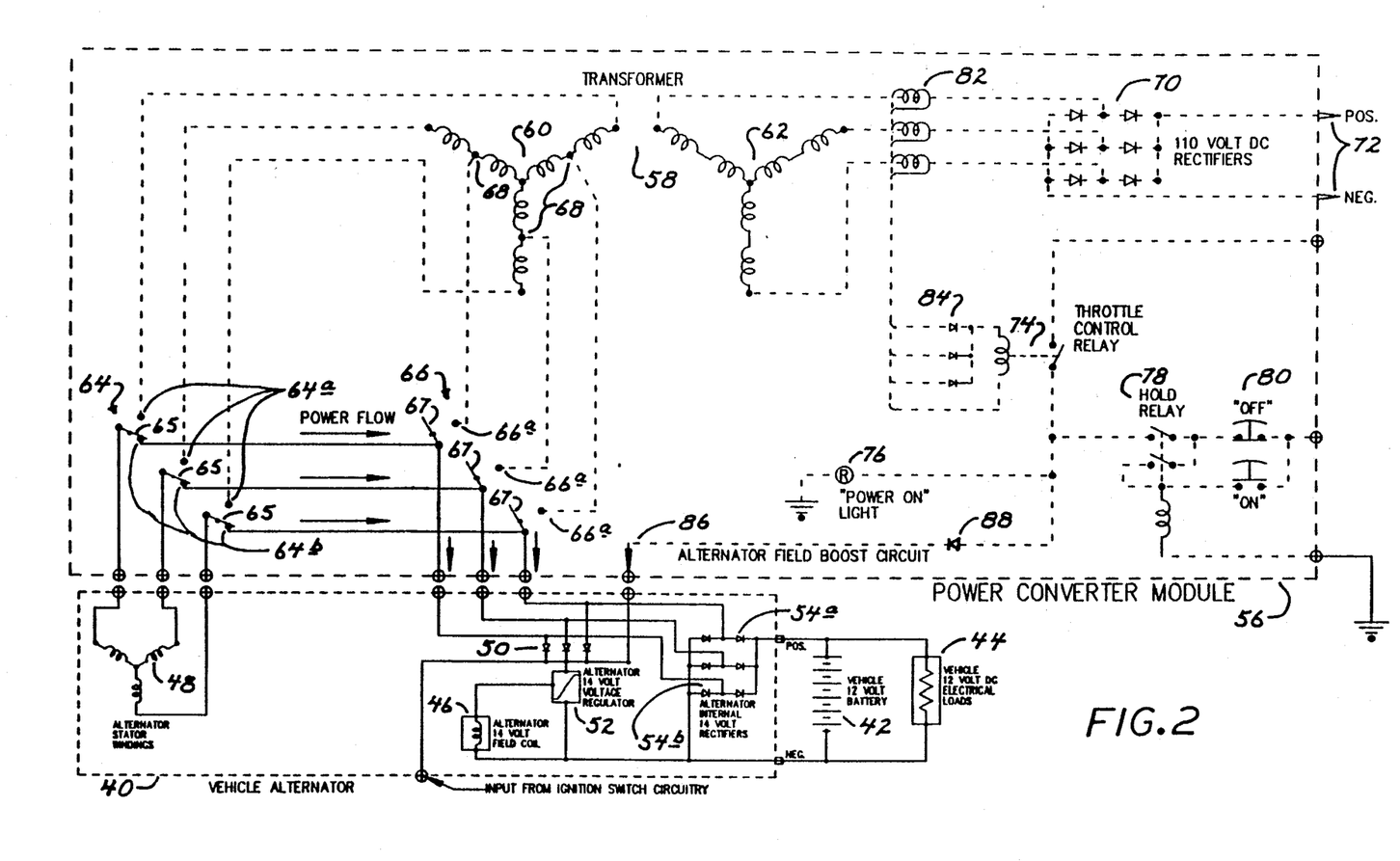
FIG. 2 is a schematic diagram of a first embodiment of an electrical generating system in the normal-power mode of operation in accordance with the present invention.

A first embodiment of an electrical generating system in accordance with the present invention, shown in the normal-power mode of operation in FIG. 2, includes a vehicle alternator 40 connected to the vehicle battery 42 and to a variety of 14-volt DC electrical loads 44. The alternator includes a field coil 46 wound on a rotor and also stator windings 48 and diodes 50, 54a, and 54b.

A plurality of diodes 50 and 54b rectifies the voltage produced from the stator windings and provides the rectified voltage to a voltage regulator 52. The output from the stator windings is also rectified by the plurality of diodes 54a and 54b. The rectified voltage from the second plurality of diodes is provided to the vehicle electrical system to charge the vehicle battery.

The embodiment illustrated in FIG. 2 also includes a converter module 56. The converter module includes a transformer 58 having primary windings 60 and secondary windings 62. The primary windings receive the output from the stator windings 48 of the alternator via a first set of switches 64. The first set of switches operates in conjunction with a second set of switches 66. Together, the switches change the alternator and converter module between a normal-power operating mode and a high-power operating mode. The normal-power mode of operation is shown in FIG. 2. The solid circuit lines in FIG. 2 and the arrows marked POWER FLOW show the parts of the circuitry carrying an electric current. The dashed circuit lines show the parts of the circuit that are inactive during normal-power operation.

The first set of switches 64 includes a set of high-power contacts 64a and a set of normal-power contacts 64b operatively and alternately connected to switch arms 65. In the normal-power mode of operation shown in FIG. 2, the first set of switches 64 are operated such that the switch arms 65 are placed in contact with the set of normal-power contacts 64b. This directs all of the stator winding output to the second set of switches 66. The second set of switches includes a set of switch arms 67 that make and break contact with a set of contacts 66a. In the normal-power mode, the second set of switches is operated such that the switch arms 67 are taken out of contact with the contacts 66a. Thus, the stator winding output from the first set of switches 64 is provided directly to the plurality of diodes 50 and 54b, and the rectified voltage is fed to the voltage regulator 52. The stator winding output from the first set of switches 64 is also provided directly to the plurality of diodes 54a and 54b. The rectified output from the plurality of diodes 54a and 54b is directed to the vehicle electrical system and to the vehicle battery. Therefore, in the normal-power mode shown in FIG. 2, the electrical system functions in a manner similar to that of the conventional system previously described in conjunction with FIG. 1 to provide electrical power to the vehicle electrical system and to the vehicle battery to keep it charged.

Figure 3:
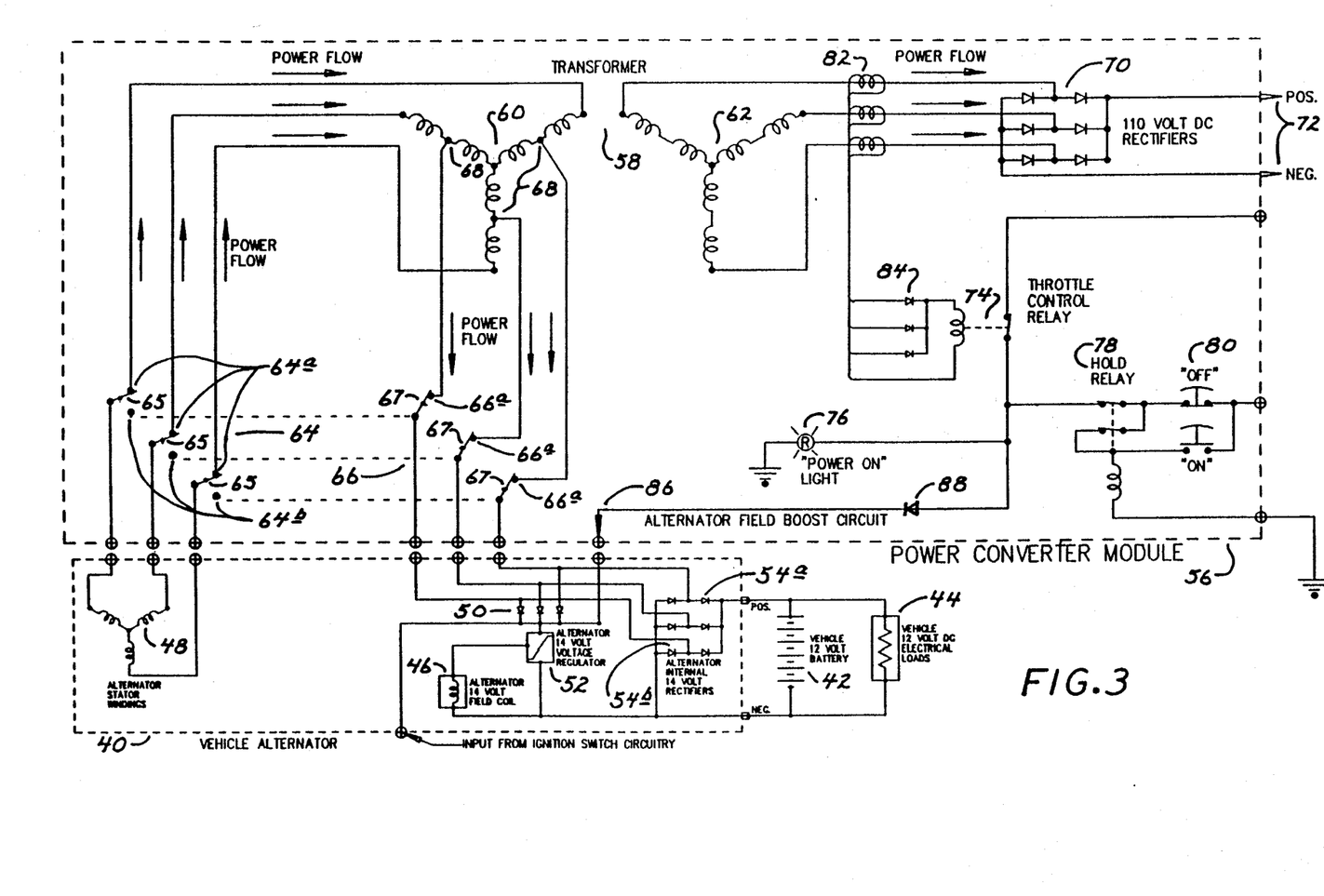
FIG. 3 is a schematic diagram of a first embodiment of an electrical generating system in the high-power mode of operation in accordance with the present invention.

The previously described first embodiment of the present invention is shown in FIG. 3 in the high-power mode of operation. In the high-power mode of operation, the first set of switches 64 are operated such that the switch arms 65 are placed in contact with the set of high-power contacts 64a. This causes all of the stator winding output to be sent to the primary windings 60 of the transformer 58 and none directly to the second set of switches 66. The primary windings include intermediate taps 68 that deliver a reduced portion of t he stator winding output in the primary windings to the second set of switches 66. In the high-power mode of operation, the switch arms 67 make contact with the contacts 66a to deliver the reduced portion of the transformer output to the first plurality of diodes 50 and second plurality 54a and 54b. The rectified voltage from the plurality of diodes 50 and 54b is fed to the voltage regulator 52 which regulates the current sent to the field coil 46 so as to maintain a rectified 14-volts DC output from the stator windings and the plurality of diodes 50 and 54b. As noted, the transformer taps 68 are selected so as to provide the 14-volt DC level to the voltage regulator at the point when the full stator output sent to the transformer will result in the production of the desired output voltage from the transformer secondary windings 62. The reduced portion of the stator output sent from the primary taps 68 to the switches 66 is also directed to the second plurality of diodes 54a and 54b, where it is rectified and provided to the vehicle electrical system and to the vehicle battery to keep it charged.

The secondary windings 62 of the transformer 58 provide the proper level of AC voltage to a plurality of diodes 70 for the desired level of rectified DC voltage directed to the output terminals 72 of the auxiliary power supply for the external loads. Current transformers 82 detect the flow of load current from the transformer secondary 62 to the diodes 70. The output from the current transformers is directed to a plurality of diodes 84 that rectify the output from the current transformers. The rectified output from the current transformers energizes a throttle control relay 74. The energized throttle control relay closes a circuit to provide vehicle-supplied 14-volt DC power to a remote throttle actuator (not illustrated) that controls the engine throttle position so that engine speed is controlled to maintain the greater voltage and higher power from the stator output. When the external load is removed, the throttle control relay 74 opens and removes the vehicle-supplied 14-volt DC power from the remote throttle actuator. The engine speed is thus reduced to a low or idling speed.

The first embodiment of the present invention shown in FIG. 2 and FIG. 3 includes a hold-relay 78 and a transmission-in-neutral switch 80. The hold-relay and the transmission-in-neutral switch are designed to ensure that the remote throttle actuator can be energized by the system only when the transmission is in neutral, rather than in gear, to prevent inadvertent actuation of the engine throttle when the vehicle is in motion. A power light 76 indicates that the high-power system is in operation. Whenever the system is in operation, 12-volt DC vehicle-supplied power is directed to an alternator field boost terminal 86 to provide field current to the voltage regulator 52 and the field coil 46 in order to prevent degenerative collapse of the alternator generated output in the event of an overload. A diode 88 prevents feedback from the vehicle ignition switch circuitry.

Figure 4:
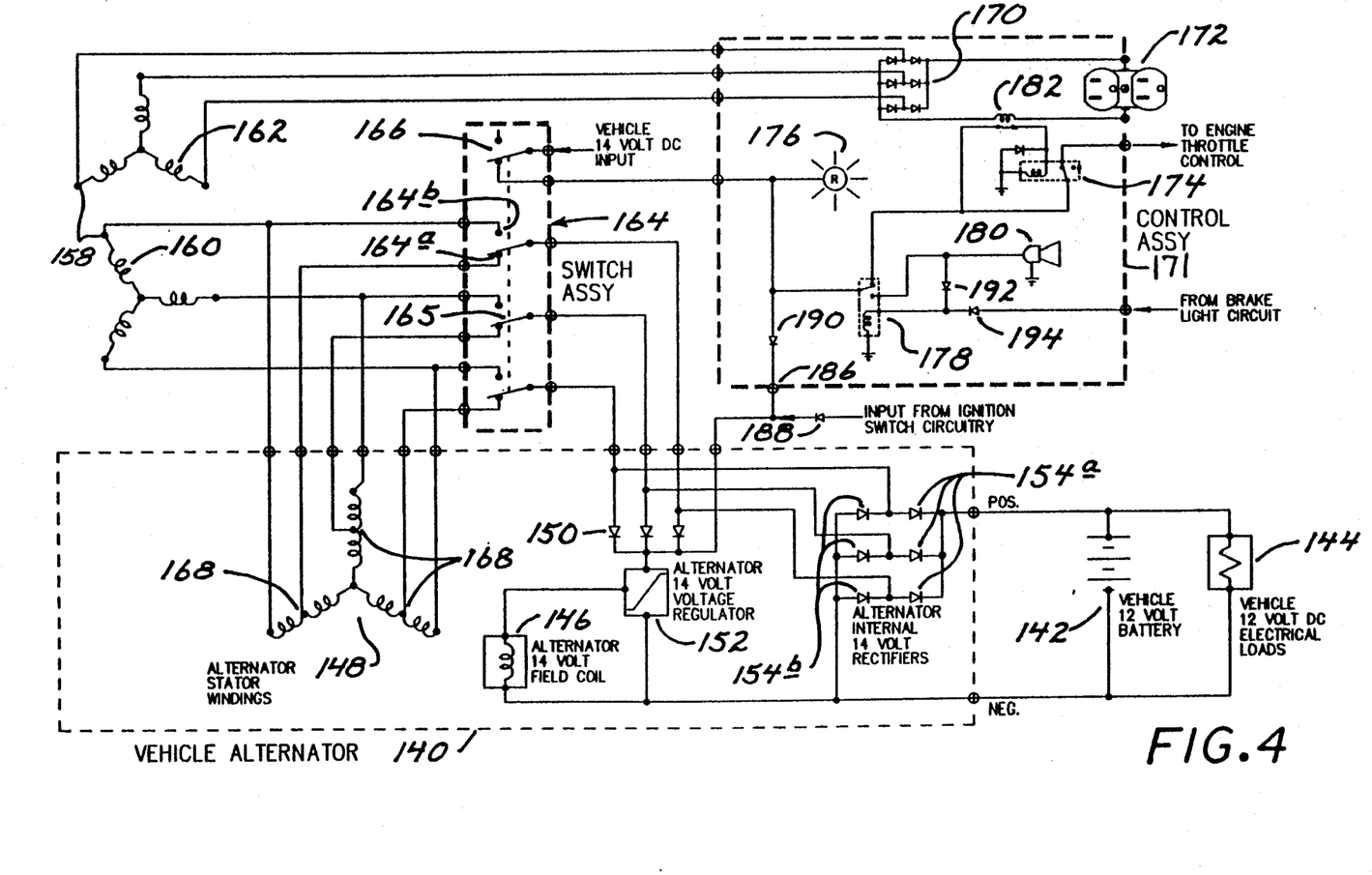
FIG. 4 is a schematic diagram of a second embodiment of an electrical generating system in the high-power mode of operation in accordance with the present invention.

A second embodiment of an electrical generating system in accordance with the present invention, shown in the high-power mode of operation in FIG. 4, includes a vehicle alternator 140 connected to the vehicle battery 142 and to a variety of 12-volt DC electrical loads 144. The alternator includes a field coil 146 wound on a rotor and also stator windings 148 and diodes 150, 154a, and 154b. The stator windings include taps 168 providing access to a reduced portion of the full generated stator voltage. A switch assembly 164 selectively directs either the full stator output or a reduced portion of the stator output to the plurality of diodes 150 and 154b. These diodes rectify the voltage and provide it to a voltage regulator 152. The switch assembly 164 also selectively directs the output from the stator windings to the group of diodes 154a and 154b. The rectified voltage from the group of diodes 154a and 154b is provided to the vehicle electrical system and to the vehicle battery to keep it charged.

The embodiment of FIG. 4 also includes a transformer 158 having primary windings 160 and secondary windings 162. FIG. 4 shows the primary windings connected directly to the full output of the stator windings 148. In actual practice a separate set of switches, not shown, can be provided to connect and disconnect the transformer primary windings and the full stator windings. The set of switches 164 includes a plurality of high-power contacts 164a and a plurality of normal-power contacts 164b operatively and alternatively connected to a plurality of switch arms 165. In the normal-power mode of operation, the set of switches 164 are operated such that the switch arms 165 are placed in contact with the set of normal-power contacts 164b. This directs all of the stator winding output directly to the plurality of diodes 150 and 154b, and the rectified output voltage is fed to the voltage regulator 152. The full stator winding output is also provided directly to the group of diodes 154a and 154b. The rectified output from the diodes 154a and 154b is directed to the vehicle electrical system and to the vehicle battery. Therefore, in the normal-power mode of the embodiment of the present invention shown in FIG. 4, the electrical system functions in a manner similar to that of the conventional system previously described in conjunction with FIG. 1 to provide electrical power to the vehicle electrical system and to the vehicle battery to keep it charged. In the normal-power mode of operation, the secondary windings 162 shown in FIG. 4 also provide a low level of AC voltage to a plurality of diodes 170 in a control assembly 171.

In the high-power mode of operation shown in FIG. 4, the set of switches 164 are operated such that the switch arms 165 are placed in contact with the set of high-power contacts 164a. The high-power contacts are connected to taps 168 on the stator windings 148 and direct a reduced portion of the stator winding output to the plurality of diodes 150 and 154b. The rectified voltage from the plurality of diodes 150 and 154b is fed to the voltage regulator which regulates the current sent to the field coil so as to maintain a rectified 14-volts DC output from the reduced portion of the output from the stator windings as rectified by the plurality of diodes 150 and 154b. As noted, the taps 168 are selected so as to provide the 14-volt DC level to the voltage regulator 152 when the full stator output sent to the transformer will result in the production of the desired output from the transformer secondary windings 162. The reduced portion of the stator output sent from the stator winding taps 168 to switch contacts 164a is also directed to the plurality of diodes 154a and 154b, where it is rectified to 14 volts DC and is provided to the vehicle electrical system and to the vehicle battery to keep it charged.

In the high-power mode of operation, the secondary windings 162 of the transformer 158 provide the proper level of AC voltage to the plurality of diodes 170, which rectify the voltage to the desired level and direct it to the output terminals 172 for the external loads.

The second embodiment of the present invention shown in FIG. 4 further includes a vehicle 14-volt input switch 166 that provides the vehicle 14-volt DC input for the throttle control circuit. An alarm-relay 178 in its de-energized condition completes the circuit for the throttle control power circuit. When the vehicle operator steps on the vehicle brake, the brake light circuit energizes the alarm relay 178. Through diode 192, the circuit causes the alarm relay to become self energized, disconnecting and locking out the power for the throttle control circuit and also activating an audible alarm 180. The purpose of this circuit is to disable the throttle control circuit any time the vehicle brakes are applied and to alert the operator to the fact that the electrical generating system may have been inadvertently left in the high-power mode. A diode 194 prevents harmful feedback from the alarm circuit back to the brake circuit.

A magnetic reed-relay 182 detects the flow of load current from the diodes 170 to the output receptacle 172 of the auxiliary power supply for external loads. The magnetic reed-relay 182 completes the vehicle-supplied 14-volt DC circuit to energize the throttle control relay 174. The energized throttle control relay closes a circuit to provide the vehicle-supplied 14-volt DC power to a remote throttle actuator (not illustrated) that controls the engine throttle position so that engine speed is controlled to maintain the greater voltage and higher power from the stator output. When the external load is removed, the throttle control relay 174 opens and removes the vehicle-supplied 14-volt DC power from the remote throttle actuator. The engine speed is thus reduced to a low or idling speed.

A power light 176 in the control assembly 171 indicates that the high-power system is in operation. Whenever the system is in operation, 14-volt DC power is directed to an alternator field boost terminal 186 to provide field current to the voltage regulator 152 and the field coil 146 to prevent degenerative collapse of the alternator generated output in the event of an overload. Diodes 188 and 189 prevent feedback to and from the vehicle ignition switch circuitry.

Figure 5:
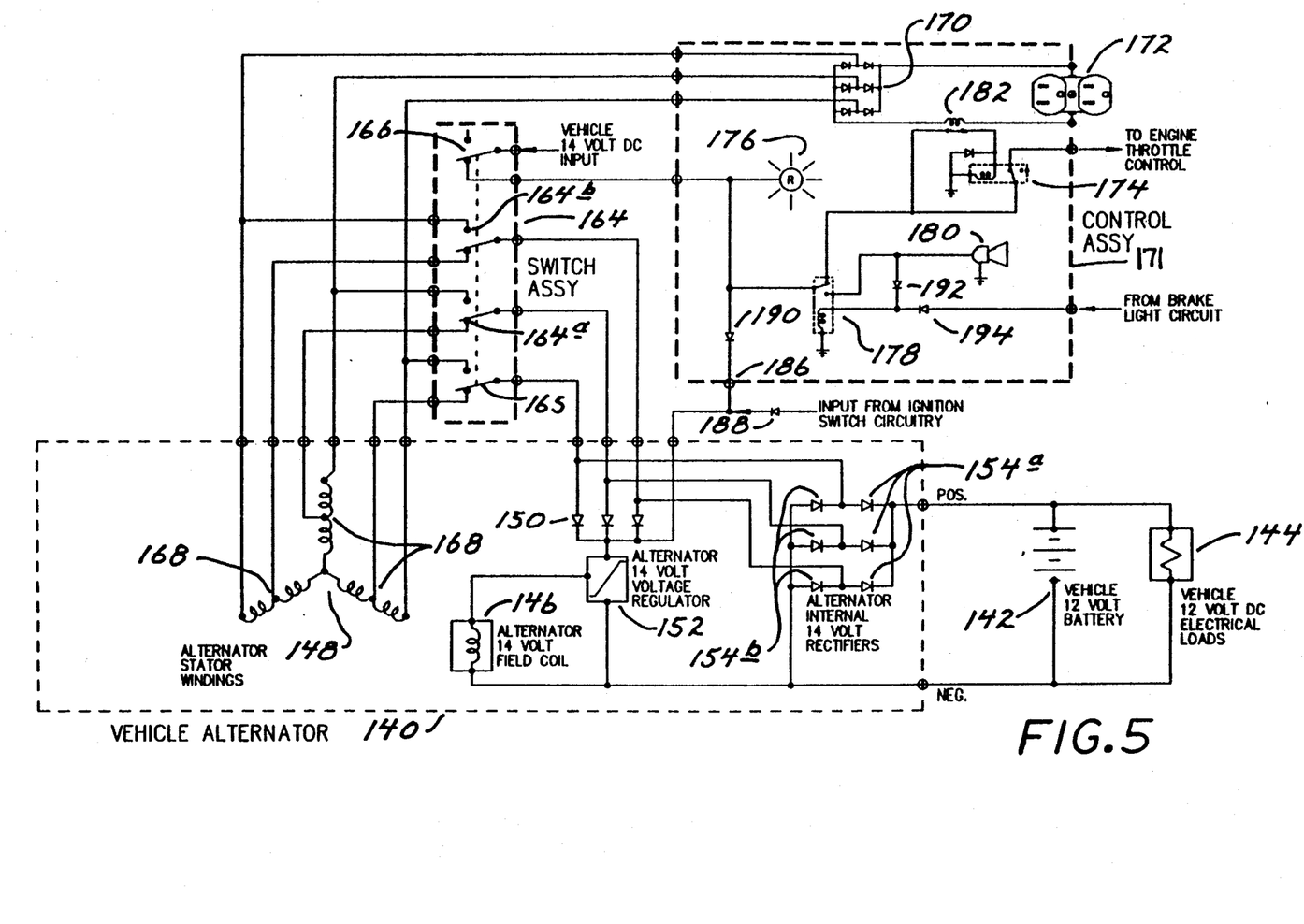
FIG. 5 is a schematic diagram of a third embodiment of an electrical generating system in the high-power mode of operation in accordance with the present invention.

A third embodiment of the present invention is shown in FIG. 5 in the high-power mode of operation. The operation of the circuit shown in FIG. 5 is the same as that shown in FIG. 4 except that in FIG. 5 the full output of the stator is fed directly to the plurality of diodes 170 for rectification and delivery to output terminals 172. In this third embodiment of the present invention, 14 volts DC would appear at the output terminals 172 during the normal-mode of operation, and 28 volts DC would appear at the output terminals 172 during the high-power mode of operation.

Figure 6:
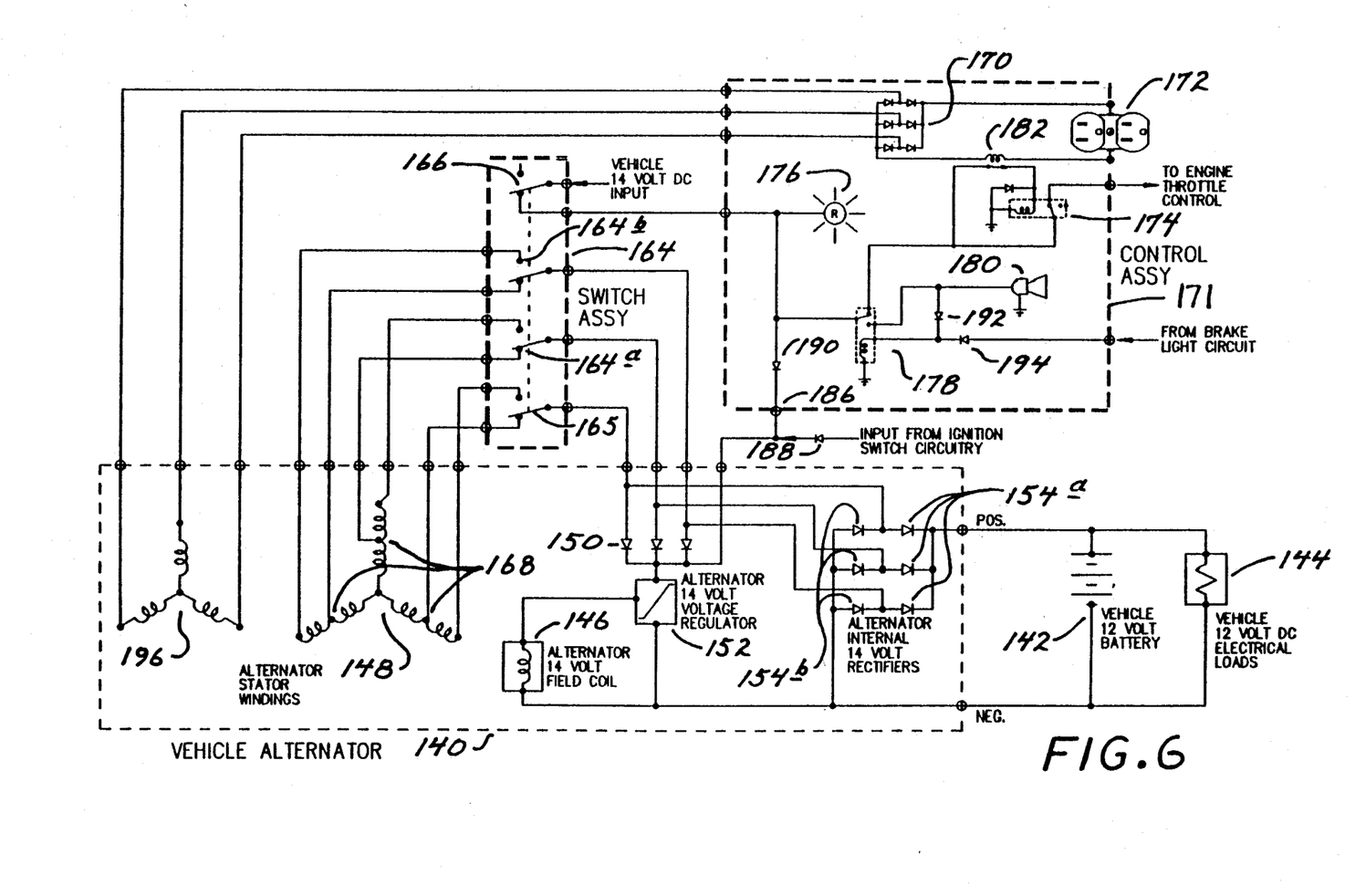
FIG. 6 is a schematic diagram of a fourth embodiment of an electrical generating system in the high-power mode of operation in accordance with the present invention.

The major portion of a fourth embodiment of the present invention shown in FIG. 6 is the same as that shown in FIG. 4 and FIG. 5 with two exceptions. One difference is that in the FIG. 6 embodiment the full output of the primary stator windings 148 is directed only to the switch contacts 164b of the set of switches 164. The other difference is that in the FIG. 6 embodiment the stator includes a secondary stator winding 196. The full output of the secondary winding 196 is directed to the plurality of diodes 170 for rectification and delivery of DC to the output terminals 172. The secondary winding is designed to have the same power capability as the primary stator winding 148 except at a different voltage. Thus, during normal-power mode operation, the secondary winding has normal power capability at a reduced voltage, and during the high-power mode of operation, the secondary winding has a high-power capability at the desired full voltage.

Thus, in accordance with the present invention, the voltage regulator controls the current to the field coil in the rotor of the alternator to maintain 14 volts DC at the voltage regulator terminals. When the alternator rectifiers, the voltage regulator, and the vehicle electrical system see substantially all of the AC voltage generated in the alternator stator, the AC voltage generated in the alternator stator windings is the correct magnitude to provide 14 volts DC. With a maximum continuous duty rating of 55 amps DC, the exemplary alternator has a maximum continuous duty power rating of 770 watts.

When the alternator rectifiers, the voltage regulator, and the vehicle electrical system are connected to the alternator stator windings to see, for example, only 55% of the AC voltage generated in the alternator stator, the exemplary alternator must be operated at a sufficiently high speed so that 55% of the generated AC voltage is the correct magnitude to provide 14 volts DC at the voltage regulator terminals. This speed normally corresponds to approximately 1400 RPM engine speed in the typical vehicle-mounted electrical system and is considered a moderate speed. When 55% of the generated AC voltage is sufficient to generate 14 volts DC at the voltage regulator terminals, the full generated AC voltage is sufficient to generate the equivalent of 25.5 volts DC at the input to the auxiliary power supply and the external loads. With a maximum continuous duty rating equivalent to 55 amps DC, the full alternator windings now have a total generating capability of 1400 watts. The normal load required to maintain the charge in the normally fully charged vehicle battery and to provide normal lighting is less than 140 watts, which leaves 1260 watts available for the auxiliary power supply and external loads.

If only 50% of the full generated output voltage of the exemplary alternator stator windings was directed back to the alternator rectifiers, the voltage regulator, and the vehicle electrical system, the engine speed would have to be raised to 1500 RPM and the full output power capability of the alternator would be the equivalent of 1540 watts at the equivalent of 28 volts DC, leaving 1400 watts available for the auxiliary power supply and external loads.

It will be appreciated from the foregoing that the present invention represents a significant advance in the field of vehicle-mounted electrical generating systems. In particular, the invention provides a vehicle-mounted electrical generating system that allows the vehicle-mounted alternator to operate at the best combination of generated voltage and current to provide high power for an auxiliary power supply used for external electrical loads while, at the same time, the alternator is supplying the correct nominal voltage and power to the vehicle electrical system and battery. It will also be appreciated that, although specific embodiments of the invention have been described in detail for purposes of illustration, various modifications may be made without departing from the spirit and scope of the invention. Accordingly, the invention is not to be limited except as by the appended claims.

I claim:

1. An electric power generating apparatus for use with the electrical system of an engine-driven vehicle, the apparatus comprising:

an engine-driven alternator having a rotor with magnetic poles and with a field coil adapted to receive an electric current and thereby produce lines of magnetic flux in said magnetic poles, a stator armature having windings that generate a voltage in response to said lines of magnetic flux when the rotor is rotated in respect to said stator, and output terminals connected to said windings;

voltage regulator means, having an input terminal, for controlling the magnitude of the current in the rotor field coil such that the voltage regulator means allows the field coil current to increase or decrease until a voltage of a predetermined level is received at the voltage regulator means input terminal;

a transformer having a primary winding with input terminals connected to the full primary winding, taps connected to a portion of the primary winding to provide a reduced portion of the full voltage applied to said input terminals, and a secondary winding with output terminals;

first switching means for switching the apparatus between a normal power state and a high power state, wherein the switching means in the normal power state directs substantially all of the voltage generated in the stator windings to the vehicle electrical system and to the voltage regulator means input terminal, and in the high power state directs substantially all of the voltage generated in the stator windings to the primary winding of the transformer; and second switching means wherein said second switching means in the high power state directs the reduced portion of the full alternator generated voltage from the taps on the transformer primary winding to the vehicle electrical system and to the voltage regulator means; wherein the voltage regulator means, in response to said reduced portion of the full alternator generated voltage applied to the voltage regulator means, increases the field coil current and thereby causes the alternator to generate a higher than normal voltage in the full stator windings to maintain the reduced portion of the full alternator generated voltage at the predetermined voltage level at the voltage regulator means input terminal.

2. An apparatus as recited in claim 1, wherein the output terminals of the secondary windings of the transformer are connected to rectifier means for converting the output of the transformer windings to DC.

3. An apparatus as recited in claim 1, wherein the output terminals of the secondary windings of the transformer are connected to control means for converting the output of the transformer windings to single phase AC.

4. An electrical power generating apparatus for use with the electrical system of an engine-driven vehicle, the apparatus comprising:

an alternator having a rotor with a field coil adapted to receive an electric current and thereby produce lines of magnetic flux, a stator armature having windings that generate a voltage in response to the lines of magnetic flux when the rotor is rotated in respect to the stator, and output terminals connected to the windings;

voltage regulator means, having an input terminal, for controlling the magnitude of the current in the rotor field coil such that the voltage regulator means allows the field coil current to increase or decrease until a voltage of a predetermined level is received at the voltage regulator means input terminals;

a transformer having a primary winding with input terminals to the full primary winding, with output terminals connected to taps to a portion of the primary winding to provide a reduced portion of the full voltage applied to the input terminals to the primary winding, and having a secondary winding with output terminals; and switching means for switching the apparatus between a normal power state and a high power state, wherein the switching means in the normal power state directs substantially all of the voltage generated in the stator windings to the voltage regulator means input terminal and to the vehicle electrical system, and in the high power state the switching means directs substantially all of the voltage generated in the stator windings to the input terminals of the primary winding of the transformer and directs a reduced portion of the voltage generated in the stator windings from the output terminals of the taps on the primary winding of the transformer to the voltage regulator means input terminal and to the vehicle electrical system such that the voltage regulator means causes the alternator to generate a higher than normal voltage in the full stator windings in order to maintain the predetermined voltage at the voltage regulator means input terminal.

5. An apparatus as defined in claim 4, wherein the output terminals of the secondary windings of the transformer are connected to rectifier means for converting the output of the transformer windings to dc.

6. An apparatus as defined in claim 4, wherein the output terminals of the secondary windings of the transformer are connected to control means for converting the output of the transformer windings to single phase ac.

7. An electrical power generating apparatus for use with the electrical system of an engine-driven vehicle, the apparatus comprising:

an alternator having a rotor with a field coil adapted to receive an electric current and thereby produce lines of magnetic flux, a stator armature having windings that generate a voltage in response to said lines of magnetic flux when said rotor is rotated in respect to said stator, and output terminals connected to said windings;

voltage regulator means, having an input terminal, for controlling the magnitude of the current in the rotor field coil such that the voltage regulator means allows the field coil current to increase or decrease until a voltage of a predetermined level is received at the voltage regulator means input terminals;

a transformer having a primary winding with input terminals to the full primary winding, and a secondary winding with output terminals;

taps connected to a reduced portion of the transformer primary winding such that the transformer primary winding acts as a voltage dividing network to provide at the output terminals connected to said taps a reduced portion of the full voltage provided to the input terminals to the full primary winding of the transformer; and switching means for switching the apparatus between a normal power state and a high power state, wherein the switching means in the normal power state directs substantially all of the voltage generated in the stator windings to the voltage regulator means input terminal and to the vehicle electrical system, and in the high power state the switching means directs substantially al of the voltage generated in the stator windings to the input terminals of the transformer primary windings and directs a reduced portion of the voltage generated in the stator windings from the output terminals of the voltage divider network means of the transformer primary windings to the voltage regulator means input terminal and to the vehicle electrical system such that the voltage regulator means causes the alternator to generate a higher than normal voltage in the full stator windings in order to maintain the predetermined voltage at the voltage regulator means input terminal.

8. An electric power generating apparatus for use with the electrical system of an engine-driven vehicle, the apparatus comprising:

an alternator having a rotor with a field coil adapted to receive an electric current and thereby produce lines of magnetic flux, a stator armature having windings that generate a voltage in response to the lines of magnetic flux when said rotor is rotated in respect to said stator, and output terminals connected to the windings;

voltage regulator means, having an input terminal, for controlling the magnitude of the current in the rotor field coil such that the voltage regulator means allows the field coil current to increase or decrease until a voltage of a predetermined level is received at the voltage regulator means input terminal;

voltage divider network means, having a first set of network output terminals connected to the voltage regulator means input terminals and a second set of network output terminals, for receiving voltage from the alternator output terminals and for applying substantially all of the received alternator voltage to the first set of network output terminals in a normal power mode and for applying a reduced portion of the received alternator voltage to the first set of network output terminals and applying a remaining portion of the received alternator voltage to the second set of network output terminals in a high power mode.

9. A electric power generating apparatus as defined in claim 8, wherein the voltage divider network means comprises:

a transformer including a primary winding and a secondary winding;

switching means for connecting the primary winding to the received alternator voltage in the high power mode; and rectifying means for receiving the output voltage from the transformer and providing a rectified voltage to the second set of network output terminals.

10. An electric power generating apparatus as defined in claim 8, further including a throttle control relay to increase the speed of the engine when the apparatus is in the high power mode.

11. An apparatus as recited in claim 9, wherein the primary winding of the transformer includes taps to provide a transformer voltage from a reduced portion of the primary windings.

* * * * *

UNITED STATES PATENT AND TRADEMARK OFFICE
CERTIFICATE OF CORRECTION

PATENT NO. : 5,066,866
DATED : 11/19/91
INVENTOR(S) : William M. Hallidy

It is certified that error appears in the above-identified patent and that said Letters Patent is hereby corrected as shown below:

In column 14, line 1, delete "al" and insert therefor --all--;

In column 14, line 21, delete "said" and insert therefor --the--;

In column 14, line 31, delete "; " and insert therefor --; and--;

In column 14, line 34, delete "terminals" and insert therefor --terminal--;

In column 14, line 45, delete "A" and insert therefor --An--;

In column 14, line 58, delete "8" and insert therefor --9--.

Signed and Sealed this

Thirteenth Day of April, 1993

Attest:

STEPHEN G. KUNIN

*Attesting Officer*     *Acting Commissioner of Patents and Trademarks*